(12) United States Patent
Carpenter et al.

(10) Patent No.: US 12,294,072 B2
(45) Date of Patent: May 6, 2025

(54) CELL PACK THERMAL MANAGEMENT APPARATUS AND METHOD

(71) Applicant: DELTA COSWORTH LIMITED, Northamptonshire (GB)

(72) Inventors: Nicholas Carpenter, Northamptonshire (GB); Alexander Acklam, Northamptonshire (GB)

(73) Assignee: Delta Cosworth Limited, Northamptonshire (GB)

( * ) Notice: Subject to any disclaimer, the term of this patent is extended or adjusted under 35 U.S.C. 154(b) by 542 days.

(21) Appl. No.: 17/639,557

(22) PCT Filed: Sep. 1, 2020

(86) PCT No.: PCT/GB2020/052088
§ 371 (c)(1),
(2) Date: Mar. 1, 2022

(87) PCT Pub. No.: WO2021/044131
PCT Pub. Date: Mar. 11, 2021

(65) Prior Publication Data
US 2022/0336885 A1 Oct. 20, 2022

(30) Foreign Application Priority Data
Sep. 2, 2019 (GB) ..................................... 1912602

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/615* (2015.04);
(Continued)

(58) Field of Classification Search
None
See application file for complete search history.

(56) References Cited

FOREIGN PATENT DOCUMENTS

| CN | 108258367 A | 7/2018 |
|---|---|---|
| DE | 102009035473 A1 | 2/2011 |

(Continued)

OTHER PUBLICATIONS

Machine Translation of KR-20130113740-A (Year: 2013).*
(Continued)

*Primary Examiner* — Gregg Cantelmo
(74) *Attorney, Agent, or Firm* — C. Brandon Browning; Maynard Nexsen PC (57) ABSTRACT

A cell pack thermal management device suitable for use with a cell pack. The device has a plurality of flexible conduits, an intake manifold and an exhaust manifold. The plurality of flexible conduits are fluidly connectable between the intake manifold and the exhaust manifold to provide a plurality of fluid paths between the intake manifold and the exhaust manifold. At least one of the intake manifold and the exhaust manifold has a manifold body, a plurality of conduit ports adapted to fluidly mate with an inlet or the outlet port of each respective flexible conduit, and a system port. The plurality of conduits ports and the system port are fluidly connected within the manifold body by a series of channels tuned for even flow distribution.

19 Claims, 7 Drawing Sheets

(51) Int. Cl.
    *H01M 10/615*     (2014.01)
    *H01M 10/643*     (2014.01)
    *H01M 10/6567*     (2014.01)
    *H01M 10/6568*     (2014.01)

(52) U.S. Cl.
    CPC ... *H01M 10/6567* (2015.04); *H01M 10/6568* (2015.04); *H01M 10/643* (2015.04)

(56) References Cited

FOREIGN PATENT DOCUMENTS

| | | | |
|---|---|---|---|
| DE | 102015101931 A1 | | 8/2016 |
| GB | 2549512 A | | 10/2017 |
| KR | 20130113740 A | * | 10/2013 |
| WO | 2017070785 A1 | | 5/2017 |
| WO | 2014132047 A2 | | 7/2018 |

OTHER PUBLICATIONS

Examination Report received for United Kingdom Patent Application No. GB1912602.8, mailed on Mar. 13, 2020, 04 pages.
International Preliminary Report on Patentability received for International Patent Application No. PCT/GB2020/052088, mailed on Mar. 17, 2022, 7 pages.
International Search Report and Written Opinion received for International Patent Application No. PCT/GB2020/052088, mailed on Oct. 22, 2020, 10 pages.
Office action received for Brazilian Patent Application No. 112022003857-7, mailed on Aug. 13, 2024, 06 pages including English translation.

* cited by examiner

CELL PACK THERMAL MANAGEMENT APPARATUS AND METHOD

TECHNICAL FIELD

The present invention relates to cell pack thermal management and particularly but not exclusively to cell pack thermal management devices, cell pack thermal management systems, and a thermally managed cell pack.

Cell packs are used in many modern applications. For example the energy source for a hybrid electric motor vehicle (HEV), an electric motor vehicle (EV) or any electric or hybrid sea, air or land vehicle. Cell packs are also used in many static installations, for example a domestic household which requires a remote electrochemical energy source. Installation of the cell packs within the application is known as packaging. Thermal management of a cell pack is often required. This includes both heating and cooling of the cell pack.

BACKGROUND

Cell packs, cell clusters or batteries (referred hereinafter simply as cell packs) are typically provided in clusters or modules of individual cells arranged in a matrix. A cell pack is typically an arrangement of individual cells or groups of cells arranged in parallel and then in series anode to cathode, to form a cell pack with the required ampacity. The cell pack module supports the cells in the desired arrangement. Due to packaging constraints it is often necessary for the cell matrix to be densely packed. The more dense the arrangement of cells the greater the energy/power density that can be achieved for a given volume.

Typically individual cells are in the form of pouch cells, prismatic cells or cylindrical cells with Lithium Ion chemistry. Each type of cell will have different dimensions. The cell pack size is driven by the specific requirements of the application, for example the voltage demand and energy output required. The performance of a cell pack is limited by a number of factors including the operating temperature of each individual cell. Typically a cell has a preferred operating temperature range, and when operating in this range the cell is able to perform preferentially. However, during discharge and recharge of cells, the cells produce heat as a by-product. When arranged in a densely packed matrix, the cells have limited heat dissipation pathways to the environment. This causes the overall temperature of the cell pack to rise and heat the individual cells to a temperature outside of the preferred operating temperature range. Also, the individual cells cannot operate effectively if they are too cold. Therefore, for devices that operate at low temperatures it is necessary to heat the cell pack to raise the temperature of each cell to its preferred operating temperature range.

The cost and weight of a cell pack can be reduced by optimising the performance of the cells in the pack. By optimising the performance of individual cells, the cell pack performs more efficiently and the requirement for extra cells is negated. Efficient thermal management of a cell is required for the performance of the cell to be optimised. Cell packs, by their very nature are heavy and expensive, when employing a thermal management system, a portion of the cell pack overall weight and cost must be attributed to the cell pack thermal management system. It is therefore advantageous to provide a thermal management system that is both efficient and of relatively low weight and low cost.

GB2549512 discloses a cell pack thermal management apparatus and method which comprises one or more flexible conduits which are fluidly connectable to a thermal management system via an intake side manifold and an exhaust side manifold. Before use, the system is filled with a thermal management fluid, for example a mix of water and ethylene glycol. During use the fluid is pumped around the system to either heat or cool the cell pack.

To ensure that such a thermal management apparatus performs effectively, it is imperative that the system is bled of any air when the system is being filled. Furthermore, it is important to ensure that there is an even distribution of thermal management fluid throughout the flexible conduits. At the same time, the thermal management system must fit within the packaging constraints of the application to which the cell pack is to be applied.

The present invention provides an improved thermal management apparatus and method which seeks to address one or more of the aforementioned challenges.

SUMMARY OF THE INVENTION

According to a first aspect of the present invention there is provided a cell pack thermal management device for use with a cell pack, the device comprising: a plurality of flexible conduits, an intake manifold and an exhaust manifold, wherein the plurality of flexible conduits are fluidly connectable between the intake manifold and the exhaust manifold to provide a plurality of fluid paths between the intake manifold and the exhaust manifold and wherein at least one of the intake manifold and the exhaust manifold comprises a manifold body, a plurality of conduit ports adapted to fluidly mate with an inlet or the outlet port of each respective flexible conduit, and a system port, and wherein the plurality of conduits ports and the system port are fluidly connected within the manifold body by a series of channels tuned for even flow distribution.

The present invention may be used with cell packs, having cells of any shape and arranged in a matrix form. The plurality of flexible conduits which provide a plurality of fluid paths between the intake manifold and the exhaust manifold allows the cooling or heating of cells to be performed in parallel and thereby reduce the overall required flow rate and/or length of flow path, and thus provide a more efficient system. To ensure an even distribution of thermal management fluid throughout the device, the series of channels provided in the manifold body are tuned. The series of channels are tuned to provide a low and even pressure drop in the manifold. This provides an equal flow to every fluid path in the device. A low pressure drop supports application of the device, for example in automotive uses, where a conventional automotive pump will be used to deliver a thermal management fluid.

The series of channels may have differing path lengths and the bore size of the channels may be different so as to provide the same pressure drop across and therefore flow rate in each of the series of channels. The cross sectional area of each channel of the series of channels is designed to give a consistent pressure drop across the manifold regardless of the length of the individual channel. This ensures that the thermal management fluid flows evenly in the manifold. The series of channels are designed to ensure that the manifold adheres to the packaging requirements of the cell pack and minimize the overall required packaging volume.

The system port may be fluidly connected to the series of channels via a main channel which is arranged centrally in the manifold. This arrangement allows a greater variety of connections arrangements to and from the system port.

The flow into each of the plurality of flexible conduits is restricted by a flow restriction so as to ensure an even flow distribution across the plurality of flexible conduits. This ensures that the thermal management fluid is delivered evenly from the intake manifold to each of the plurality of flexible conduits, or drawn evenly from each of the plurality of flexible conduits to the exhaust manifold. This also ensures that any air is bled from the device, when the device being filled with thermal management fluid for the first time.

Each of the plurality of flexible conduits may have an inlet spigot at one end thereof adapted to be connected to the intake manifold, preferably wherein the inlet spigot provides the flow restriction. Each of the plurality of flexible conduits may have an outlet spigot at another end thereof adapted to be connected to the exhaust manifold, preferably wherein the outlet spigot provides the flow restriction. The spigot provides a low profile connection to the manifold. This compactness of design enables the plurality of flexible conduits which provide the plurality of fluid paths between the intake manifold and the exhaust manifold to be arranged to pass between every row of cells.

The manifold body may be configured to fill with thermal management fluid, bleed of air and operate in any orientation. This supports a variety of packaging requirements. The bore size of the series of channels may ensure that there is a sufficiently controlled flow of thermal management fluid to flush any air through the series of channels whilst filling with thermal management fluid. By ensuring that the series of channels may have sufficiently small bore sizes, air may be bled from the series of channels regardless of cell pack module orientation.

The manifold body may comprise an inner shell and an outer shell, preferably wherein the inner shell and the outer shell are adapted to be joined in a sealed fashion by mutually interlocking features and or welding and or bonding.

The plurality of conduit ports may be provided in the inner shell, preferably wherein the inlet or outlet port of the flexible conduit is bonded and or welded or otherwise sealed to respective plurality of conduit ports.

The plurality of conduit ports may be arranged along an axis X of the inner shell.

The series of channels may be defined, in part, in recesses provided in the inner shell, the outer shell or a combination thereof.

The intake manifold and exhaust manifold may be substantially identical.

The system port may be flush with an outer surface of the outer shell. The system port may have a push-fit joint. By providing the system port flush with the outer surface of the outer shell, the manifold has a low profile and therefore the packaging space may be dedicated to the cell pack, or other items, rather than the thermal management device. By providing a push-fit joint, fluid can be supplied to the intake manifold and drawn from the exhaust manifold by conduits orientated in a number of ways. This allows a variety of connection arrangements for delivery and extraction of thermal management fluid. This is also beneficial when employing a series of cell pack thermal management devices that allow minimal packaging of not only the modules but the thermal management device too.

The plurality of flexible conduits may comprise two or more flexible conduits, preferably wherein the plurality of flexible conduits may comprise six flexible conduits. The number of conduits is equal to the number of rows of cells in the cell pack module plus one, so that both the outermost rows cells of the cell pack module are surrounded by a flexible conduit.

At least one of the plurality of flexible conduits may be formed by one of; a pair of sheets joined along their longitudinal edges to provide longitudinal edge seals, or a single sheet folded and joined at the opposing longitudinal edges to provide a longitudinal edge seal, or a tube.

At at least one of the plurality of flexible conduits may be provided with a longitudinal spacer to maintain separation of the two sheets, or opposed surfaces of the single sheet.

According to a second aspect of the present invention there is provided a cell pack thermal management system suitable for use with a cell pack comprising: a pump; a heat exchanger; and a cell pack thermal management device according to another aspect of the present invention wherein the system port of the intake manifold in fluid communication with a heat exchanger and the system port of the exhaust manifold is in fluid communication with a pump, the pump provided to circulate fluid through the cell pack thermal management device thereby providing a temperature gradient between the cell pack and the fluid.

According to a third aspect of the present invention there is provided a cell pack comprising: a plurality of cells; and a cell pack thermal management system of the second aspect of the present invention. The plurality of cells may be arranged in a matrix, and the flexible conduit of the cell pack thermal management arrangement may pass between the plurality of cells so as to enable cooling or heating the cells. The surface of the flexible conduit may advantageously conform to the shape of the individual cells to provide direct contact with the cell surface so as to provide a contact area for thermal energy exchange.

BRIEF DESCRIPTION OF THE DRAWINGS

One or more embodiments of the invention will now be described, by way of example only, with reference to the accompanying drawings, in which:

FIG. 2a shows an isometric view of an exemplar flexible conduit for use in an embodiment of the invention;

FIG. 2b shows a cross-section of the exemplar flexible conduit of FIG. 2a;

FIG. 2c shows a cross-section of an alternate flexible conduit;

FIG. 3a shows an isometric view of an exemplar spigot for use in an embodiment of the invention;

FIG. 3b shows an alternate isometric view of an exemplar spigot for use in an embodiment of the invention;

FIGS. 7a to 8c show a variety of configurations and orientations for installation of the thermal management device of FIG. 1;

DETAILED DESCRIPTION

With reference to FIGS. 1 to 6, a cell pack thermal management device 10, has a flexible conduit 100, an intake manifold 200 and an exhaust manifold 300.

Figures 2A, 2B, 2C, 3A, 3B:
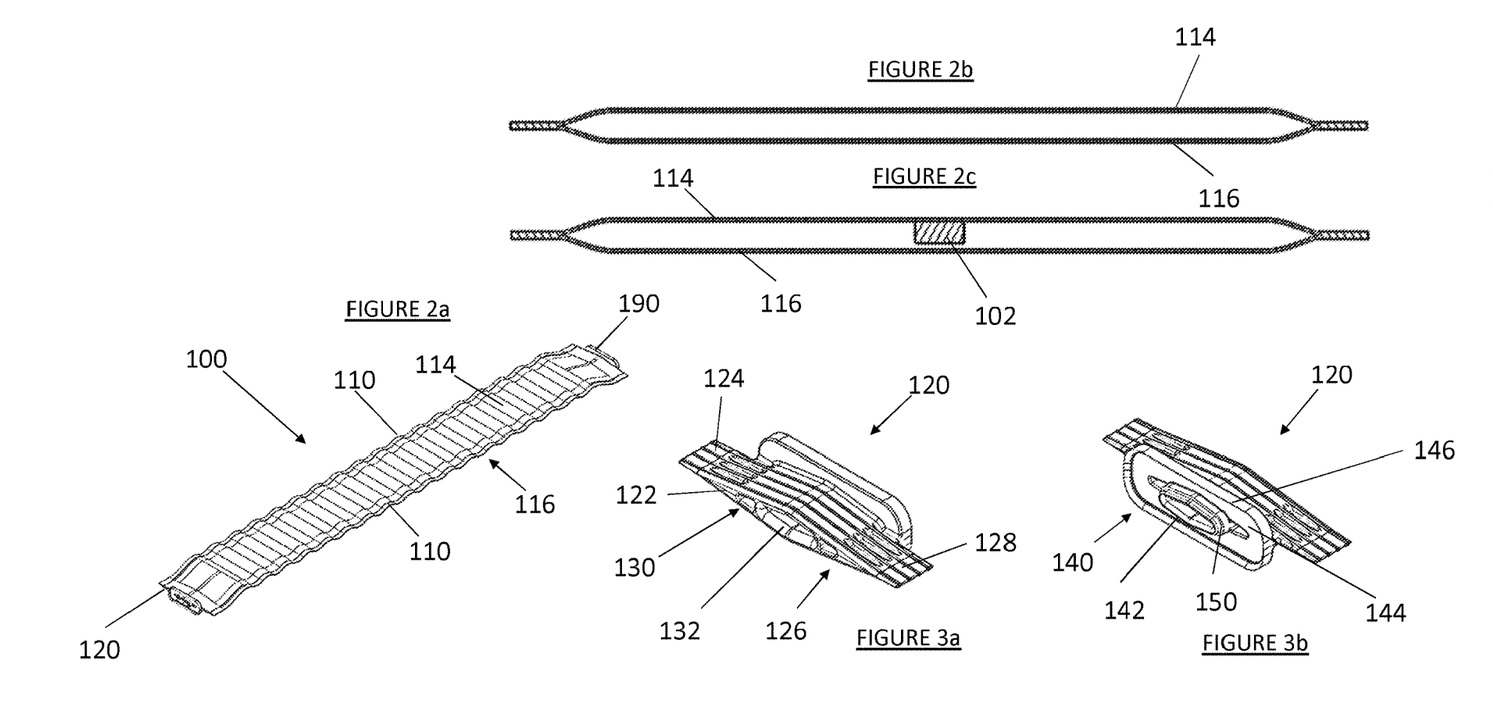

The flexible conduit 100 is made of two polyethylene laminates. The polyethylene sheets are joined along their longitudinal edges to provide longitudinal edge seals 110, thereby forming the flexible conduit. The two sheets are joined by welding the polyethylene sheets.

Alternatively, the flexible conduit 100 is made from a single sheet of polyethylene, folded and the opposing longitudinal edges joined by welding to form longitudinal edge seal 110, thereby forming the flexible conduit.

Alternatively still, the flexible conduit 100 is made of laminates comprising alternate materials, not limited only to polyethylene.

The flexible conduit 100, has an inlet spigot 120, an outlet spigot 190, an upper surface 114 and a lower surface 116. The upper surface 114 and the lower surface 116 of the flexible conduit 100 conform to the shape of the cells to which they are contiguous. Where there is no contact between the flexible conduit and a cell, the surface of the flexible conduit 100 expands to the limit allowed by a plate or boundary defining the limit of a cell pack.

The flexible conduit 100 may be provided with a longitudinal spacer 102 (see FIG. 2c). The spacer 102 may be arranged centrally within the flexible conduit 100 and helps to maintain separation of the opposed surfaces 114, 116 of the flexible conduit 100. The spacer 102 is arranged centrally on one side of the sheet. The spacer 102 could be attached to both sides. The spacer 102 is a silicone strip. An adhesive is applied to one side of the silicone strip. The spacer 102 could be free floating within the flexible conduit 100. The spacer 102 could be made of other materials.

The inlet spigot 120 and outlet spigot 190 are substantially identical, such that only the inlet spigot 120 will be described in detail.

Referring to FIGS. 3a and 3b, the inlet spigot 120 comprises a main body 122 having an upper surface 124, a lower surface 126, a conduit face 130 and a manifold face 140. The main body is lozenge shaped.

Both the upper surface 124 and the lower surface 126 are provided with a series of ridges 128 running from side to side (i.e. parallel with the conduit face 130 and the manifold face 140). The ridges 128 act as energy directors as will be explained in more detail below. The ridges 128 may be approximately 0.2 mm in height.

The manifold face 140 has a plate 144. The plate 144 includes a flange 146. The flange 146 extends away from the manifold face 140. The flange 146 acts as energy directors as will be explained in more detail below.

The conduit face 130 defines a conduit port 132. The manifold face 140 defines a manifold port 142. The conduit port 132 and the manifold port 142 are fluidly connected through a hollow space provided in the main body 122. The pressure drop through the spigot 120 is tuned. The manifold port 142 provides a restriction of the flow from the intake manifold 200 to the flexible conduit 100 as will be explained in more detail below.

The manifold port 142 is surrounded by a shear join connector 148 which extends away from the manifold face 140. The shear join connector 148 includes a shoulder 150.

Referring briefly to FIGS. 10a to 10d, an alternate spigot 700 is described. The alternate spigot has many features in common with the inlet spigot 120 and outlet spigot 190 hereinbefore described, such that only the substantial differences shall be described. Similar features are provided with similar reference numerals, pre-fixed with a "7" instead of a "1" to denote that those features correspond to the alternate spigot 700. For the avoidance of doubt, the alternate spigot 700 may be employed equally as an inlet or an outlet spigot.

The conduit face 730 is provided with four conduit ports 732 arranged across the spigot 700 between the upper surface 724 and lower surface 726. Each of the four conduit ports 732 are fluidly connected via respective hollow spaces provided in the main body 722 to four manifold ports 742 provided in the manifold face 740. The shear join connector 748 surrounds all four manifold ports 742 provided in the manifold face 740

Because of the discrete ports 732, 742 which are distributed across the width of the spigot 700, the main body 722 is flatter in shape than the inlet spigot 120, such that a substantial portion of the upper surface 724 and lower surface 276 are parallel. This means that the upper and lower surfaces 724, 726 of the spigot 700 more closely conform to the overall cross-sectional shape of the flexible conduit 100 as shown in FIGS. 2b and 2c.

Figure 4A:
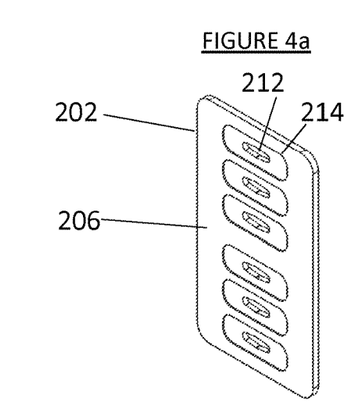
FIG. 4a shows an isometric view of an exemplar inner manifold shell for use in an embodiment of the invention.

Referring now to FIG. 4a onwards, the intake manifold 200 and exhaust manifold 300 are substantially identical such that only the intake manifold 200 will be described in detail.

Figure 5A:
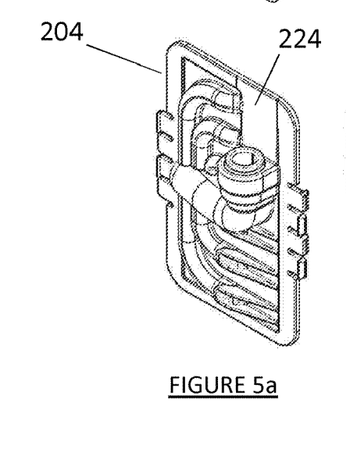
FIG. 5a shows an isometric view of an exemplar outer manifold shell for use in an embodiment of the invention.

The intake manifold 200 comprises an inner shell 202 and an outer shell 204. Both the inner shell 202 and the outer shell 204 are rectangular.

The inner shell 202 (see FIGS. 4a and 4b) has an inner surface 206 and an outer surface 208. The inner shell 202 has six ports 212 arranged centrally along a longitudinal axis X. Each port 212 provides, in use, fluid communication through the inner shell 202 between the inner and outer surfaces 206, 208. The ports 212 on the inner surface 206 are provided in respective recessed regions 214. The ports 212 on the outer surface 208 are flush with the outer surface 208. The outer surface 208 is provided with a border flange 216 which extends away from the outer surface 208, for the entire periphery of the rectangle forming the inner shell 202.

Figure 4B:
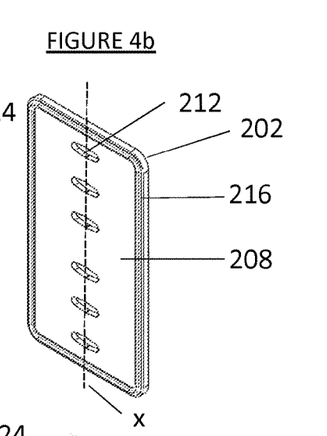
FIG. 4b shows an alternate isometric view of an exemplar inner manifold shell for use in an embodiment of the invention.

As will be understood by the skilled person, the inner shell 202 can be adapted to accommodate the alternate features of alternate spigot 700, or other designs of spigot.

Figure 5B:
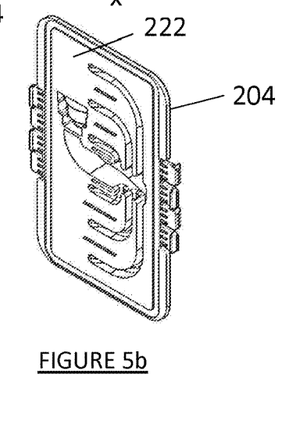
FIG. 5b shows an alternate isometric view of an exemplar outer manifold shell for use in an embodiment of the invention.

The outer shell 204 has an inner surface 222 and an outer surface 224.

Figures 5C, 5D:
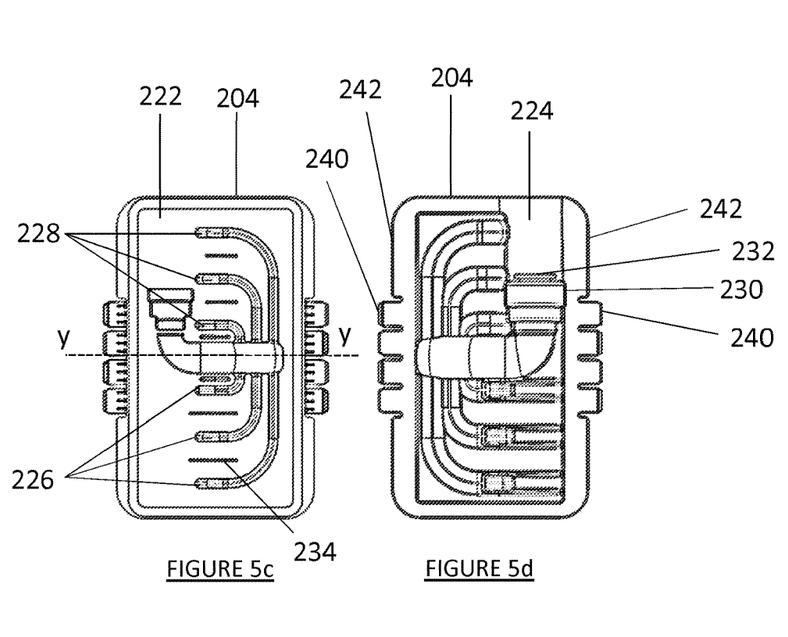
FIG. 5c shows a plan view of an exemplar outer manifold shell for use in an embodiment of the invention.
FIG. 5d shows an alternate plan view of an exemplar outer manifold shell for use in an embodiment of the invention.
Figure 6A:
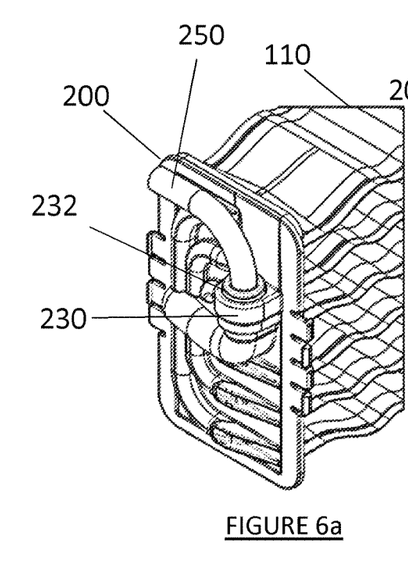
FIGS. 6a, 6b, 6c and 6d show alternate partial isometric views of the thermal management device of FIG. 1.
Figures 6B, 6C:
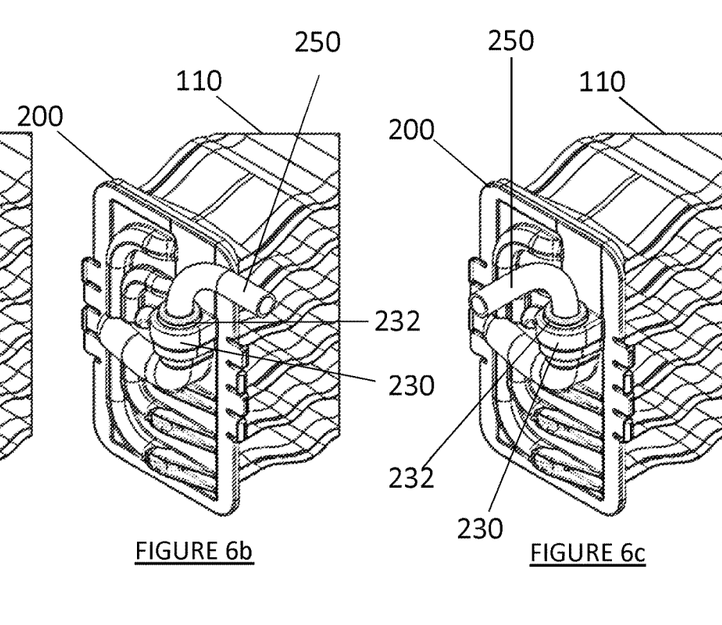
Figure 6D:
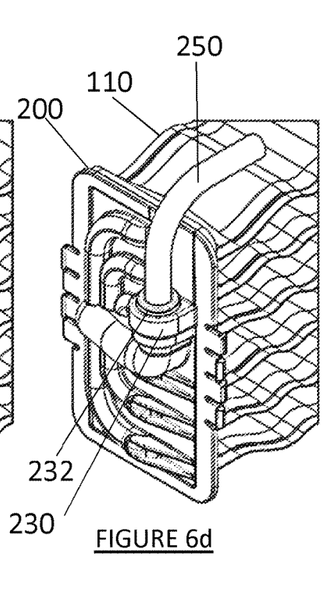

The outer shell 204 has a central axis Y. A main channel, aligned with the central axis Y, is defined by a main recess 226 in the inner surface 222. A series of six curved elongate recesses 228 are defined in the inner surfaces 222. The series of curved elongate recesses 228 converge at the main recess 226. The series of six curved elongate recesses 228 are a mirror image reflection about the central axis Y, with three curved elongate recesses 228 provided above the central axis Y and three curved elongate recesses 228 provided above the central axis Y. Each of the three curved elongate recesses 228 provided above the central axis Y have different path lengths, owing to the geometry of the outer shell 204.

The inner surface 222 has weld concentrators 234 arranged between the series of six curved elongate recesses 228.

When viewed from the other side (see FIG. 5d), the outer shell 204 outer surface 224 has a series of formations comprising the main recess 226 and series of six curved elongate recesses 228 formed in the inner surface 222. The outer shell 202 is made of injection moulded polyethylene. The outer shell 202 could be made of other plastics, or other materials such as a cast metal.

A system port 230 is provided in fluid communication with the main channel through the outer shell 204. A joint 232 is provided in the system port. The joint 232 may comprises a sleeve, collet and O-ring arrangement, where the parts are assembled to provide a push-fit joint.

The outer shell 204 is provided with a number of attachment features 240 on each of its longitudinal edges 242.

Method of Assembly

All parts, that is the flexible conduit 100, the inlet spigot 120, the outlet spigot 190, the inner shell 202 and the outer shell 204, use an ultrasonic weld process to connect them to the mating part. In an alternate method of assembly, a heat weld process may be used, or if alternate materials are used, other manufacturing methods.

The conduit 100 is first produced by heat welding the two polyethylene sheets together along the edges to form longitudinal edge seals 110.

The inlet spigot 120 is then placed into one end of this conduit 100 such that the conduit face 130 of the inlet spigot 120 faces into the conduit 100. The inlet spigot 120 is ultrasonically welded to the inner surface of the two polyethylene sheets creating a sealed joint between the two parts. The series of ridges 128 provided on the upper surface 124 and lower surface 126 act as energy directors as the inner surface of the two polyethylene sheets are ultrasonically welded.

The process is repeated at the other end of the conduit 100 with the outlet spigot 190 creating an assembly with a spigot at each end (see FIG. 2). Each of the inlet spigot 120 and outlet spigot 190 thereby have a conduit port 132 facing the flexible conduit 100.

Six of these conduit and spigot assemblies are taken and have an inner shell 202 welded to each end to create a sealed join between the assembly and the inner shell 202.

The flange 146 of the plate 144 on the manifold face 140 of each the inlet spigots 120 is mated with the respective recessed region 214 provided on the inner surface 206 of the inner shell 202. The shoulder 150 of the shear join connector 148 abuts the port 212. This ensures that each conduit port 132 is aligned with each respective port 212 provided in the inner shell 202, and provides a robust join.

The process is repeated the other end for the outlet spigots 190.

Figure 1:
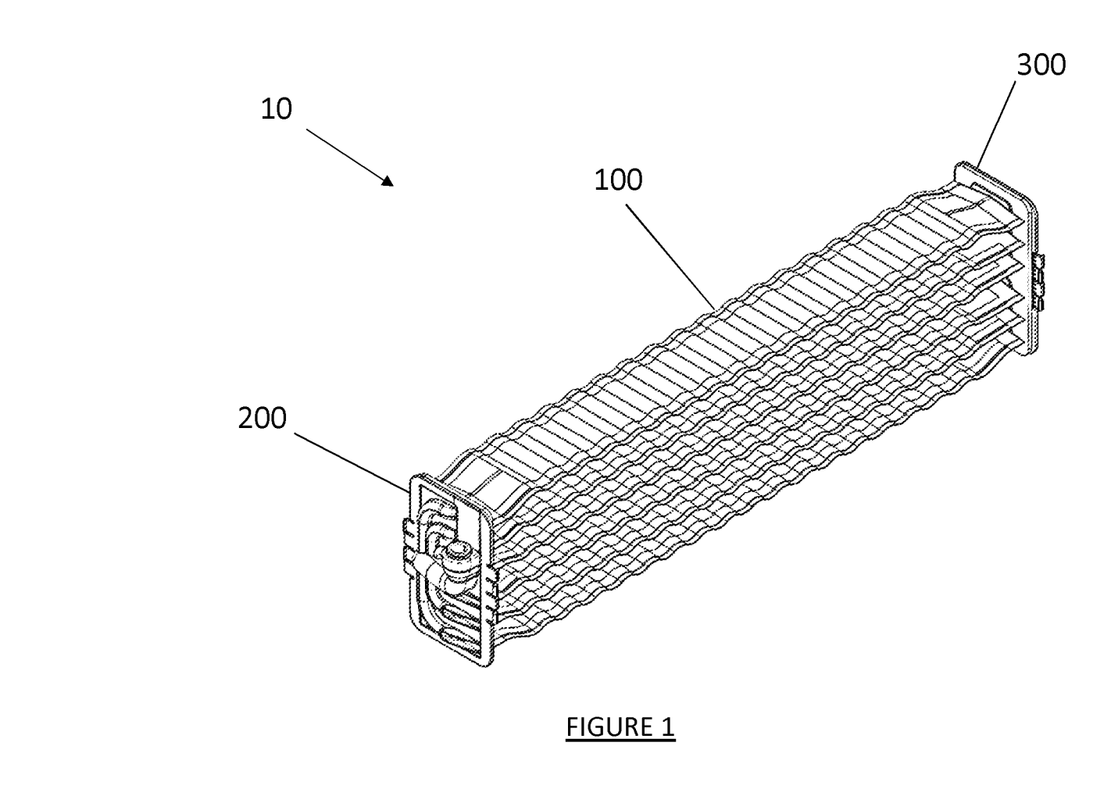
FIG. 1 shows an isometric view of the cell pack thermal management device according to a first embodiment of the invention.

This creates an assembly with inner manifold plates 202 at each end and six flexible conduit 100 rows. The spigots 120, 190 provides a low profile connection to the inner manifold plates 202. This compactness of design enables the flexible conduits 100 to be placed between every row of cells of the cell pack.

The final operation is to weld two outer shells 204 onto the outer surface 208 of the inner shells 202 to create a thermal management device 10. The border flange 216 provided on the outer surface 208 of the inner shell 202 aids alignment of the inner and outer shells 202, 204 and acts as an energy director. The outer weld creates a strong sealed bond to stop any leaking or bursting. The weld concentrators 234 arranged between the series of six curved elongate recesses 228 provide a number of addition joins and therefore prevent any bulging of the manifold during operation.

Once the inner shell 204 and outer shell 206 are welded, the series of six curved elongate recesses 228 defined in the inner surface 222 are closed by the inner surface 208 of the inner shell 202 to define a series of channels. Similarly the main recess 226 is closed by the inner surface 208 of the inner shell 202 to define a main channel. As such, the ports 212 and the system port 230 are fluidly connected within the manifold body by a series of channels. The series of channels emanate from the same main channel. The series of six curved elongate recesses 228 are shaped carefully to direct the flow to and from the main recess 226, along the series of channels, rather that acting upon the outer surface 208 of the inner shell 202 and the inner surface 222 of the outer shell 204.

Installation

Referring to FIGS. 6a to 8c the thermal management device 10 may be installed in a variety of configurations and orientations.

In particular, and as shown in FIGS. 6a to 6d a connector pipe 250 may approach or lead away from the joint 232 of the system port 230 at a number of angles. This allows for a variety of packaging solutions.

Figure 7A:
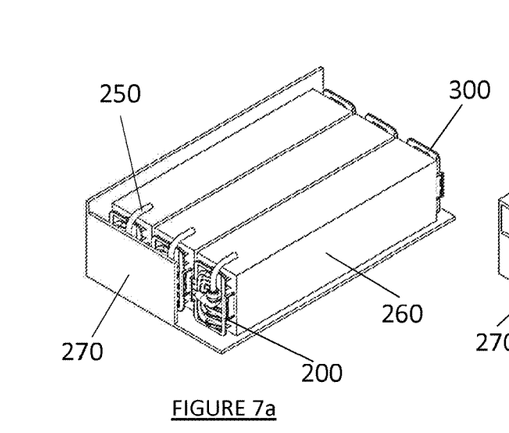
Figure 7B:
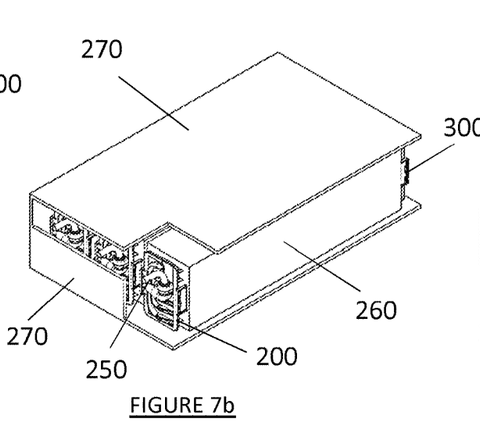
Figure 8A:
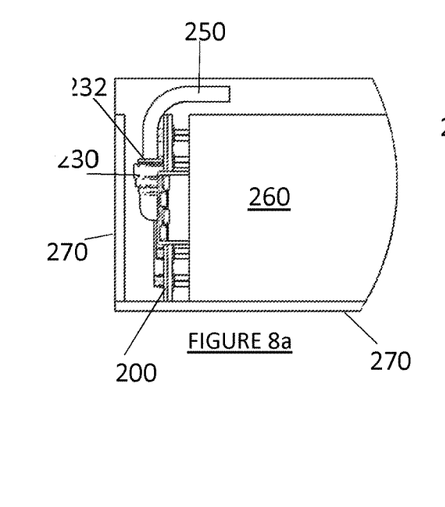
Figure 8B:
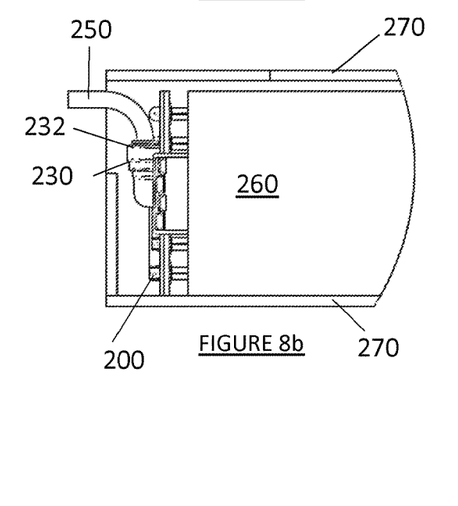
Figure 8C:
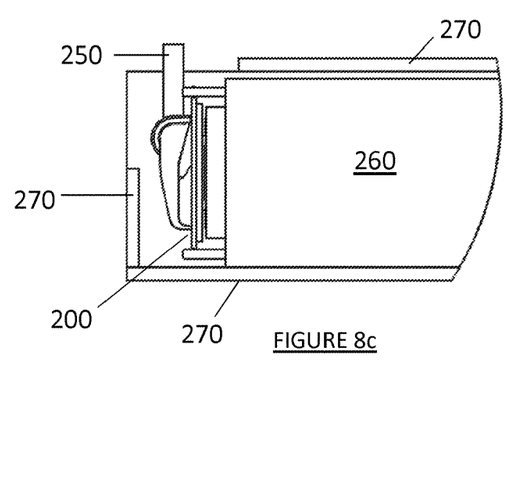

The beneficial effect is even more evident when considering a bank of call packs 260 housed within a limited space where the bay walls 270 provide little clearance for fluid connections to and from the manifolds 200, 300.

Figure 7C:
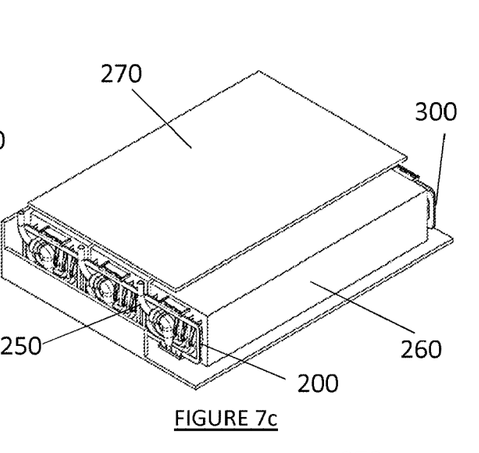

It is also worthwhile noting that the manifolds 200, 300 may be employed equally in any orientation, for example consider the arrangement of FIGS. 7c and 8c, where the module, and thus the intake manifold 200 is oriented onto one side.

Usage

Figure 9:
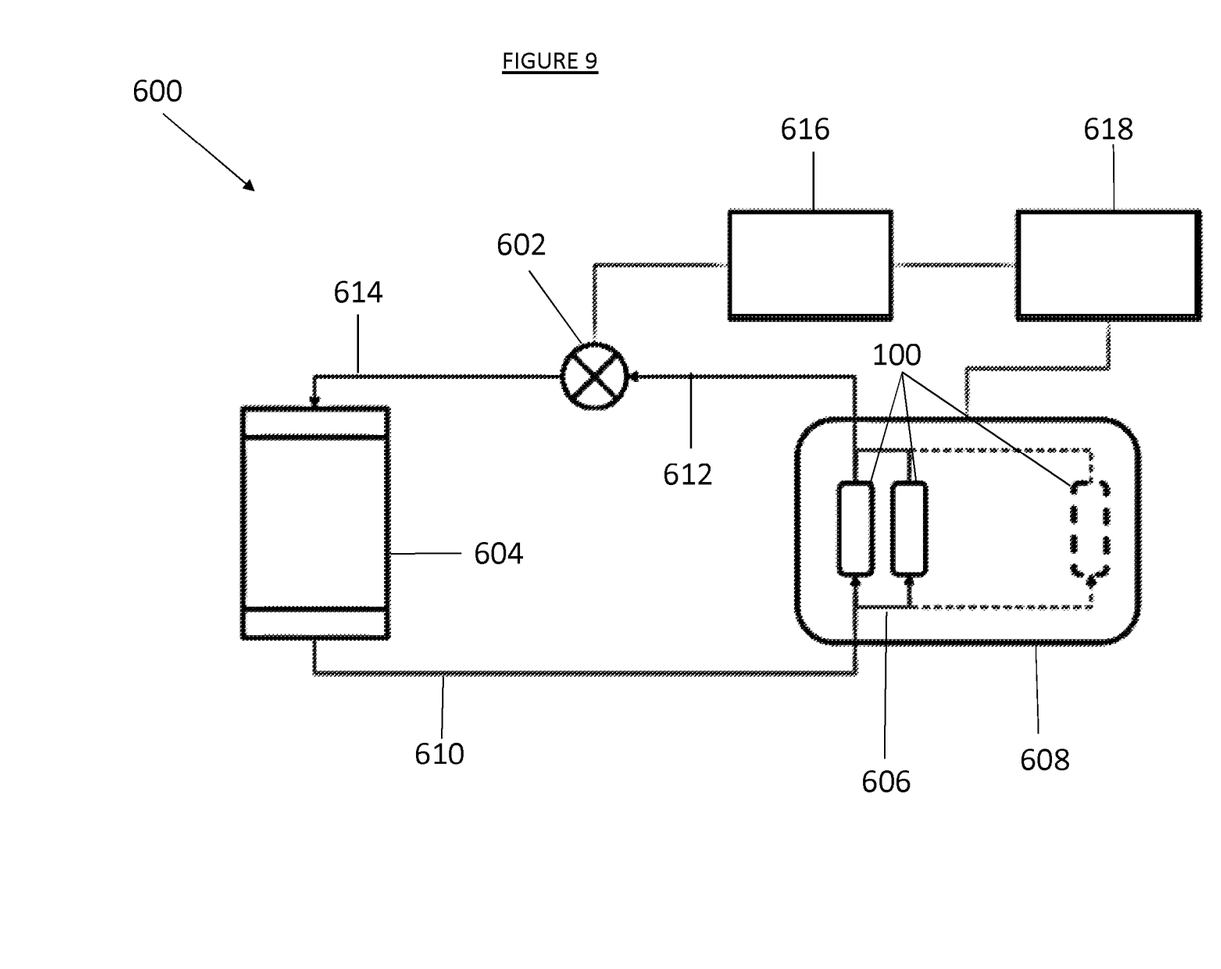
FIG. 9 shows a schematic overview of a thermal management system according to the present invention.
Figure 10A:
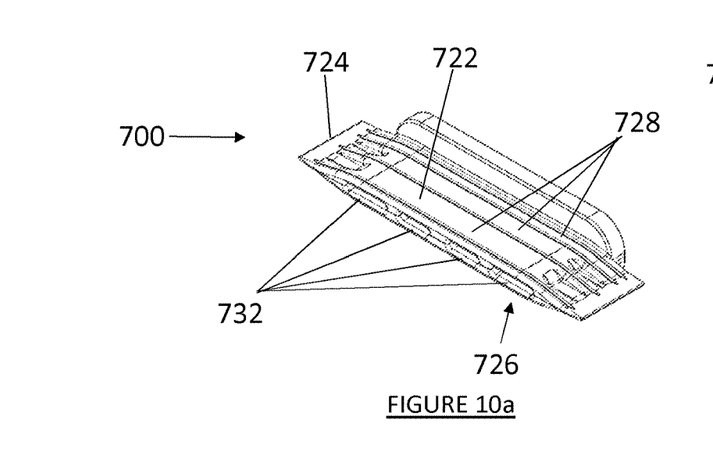
FIGS. 10a to 10d show an alternate exemplar spigot for use in an embodiment of the invention.
Figure 10B:
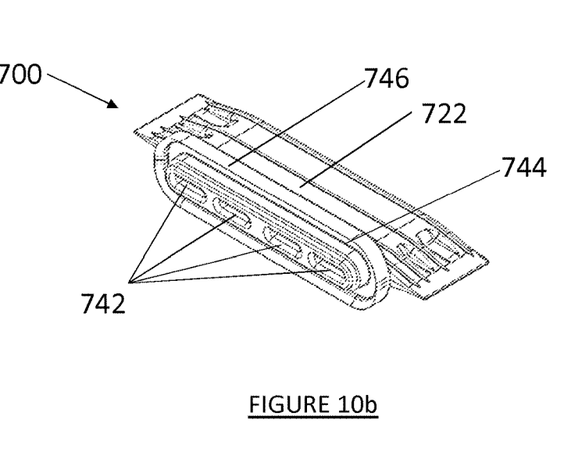
Figure 10C:
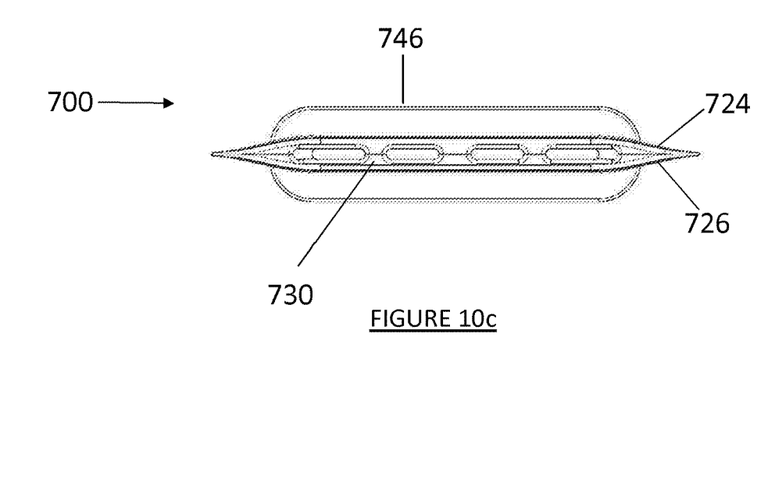
Figure 10D:
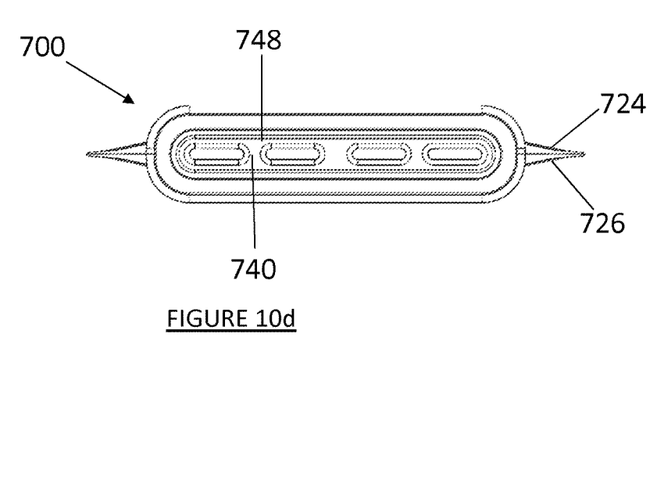

Referring to FIG. 9, the cell pack thermal management device 10 is shown connected in a fluid circuit thereby forming a cell pack thermal management system 600. The cell pack thermal management system 600 has a heat exchanger 604, pipes 610, 612, 614, pump 602, controller 616, a cell pack monitoring system 618 and a cell pack thermal management arrangement 606.

The cell pack thermal management arrangement 606 has one or more cell pack thermal management devices 10, each cell pack thermal management device 10 is substantially identical. It should be noted that each cell pack thermal management device 10 could be differing lengths. As illustrated, the cell pack thermal management devices are in fluid communication with each other in a parallel formation. In an alternate embodiment, the cell pack thermal management devices may be provided in a combination of a series and parallel arrangement.

The system port 230 of each intake manifold 200 is in fluid communication with heat exchanger 604 via pipe 610, for example via connector pipe 250, (see FIGS. 6a to 6d). The system port 230 of each exhaust manifold 300 is in fluid communication with pump 602 via pipe 612, for example via connector pipe 250, (see FIGS. 6a to 6d). The pump 602 is in fluid communication with heat exchanger 604 via pipe 614. The pump 602 is controlled by controller 616 which is in wired or wireless communication with the pump. The controller 616 receives status data, either via a wired or wireless connection, from the cell pack monitoring system 618 which monitors cell pack 608.

In use, the cell pack thermal management system 600 is filled with a thermal management fluid such as a water and ethylene glycol mix. Because the cell pack thermal management device 10 is formed in a "dry" state, the flexible conduits and associated fluid paths may be partially filled with air. In order to fill the cell pack thermal management device 10 with thermal management fluid, any air present in the device 10 must be bled to the atmosphere.

By configuring the series of channels tuned for even flow distribution, this also ensures that the series of channels in the manifold are filled evenly. This prevents the build-up of air pockets. Furthermore, the reduced cross-sectional area of the series of channels ensures that there is a sufficiently controlled flow of thermal management fluid to flush any air through the series of channels.

This ensures that the thermal management fluid is delivered evenly to all six of the channels, which in turn supply the flexible conduits 100. This ensures a consistent performance of the system as a whole.

In an embodiment comprising a flexible conduit 100 having a spacer 102, the spacer 102 allows for the flexible conduit 100 to be in an open state during the fill and bleed process. The spacer 102 runs longitudinally along the flexible conduit 100, oriented with the thermal management fluid flow direction. This encourages fluid to flow through the open channel of all flexible conduits 100, rather than favouring a channel of a flexible conduit 100 that is the most open and bypassing the other channels of the flexible conduits 100. In addition, the spacer 102 also helps the flexible conduit 100 conform to the cells during installation, ensuring that there are no pinch-points or areas around the cell that may become tight during inflation. The total cross-sectional width of the spacer 102 and sheets making up the flexible conduit 100 is smaller than the space in the cell pack that the flexible conduit 100 is arranged within in module. This allows for full inflation of the flexible conduit 100 with thermal management fluid.

In an alternate embodiment the flexible conduit 100 is pre-formed in an open form prior to installation. This means that a spacer 102 would not be required as the flexible conduit 100 channel would all be open and allow fluid to flow evenly during the fill and bleed process.

The thermal management fluid is circulated around the fluid circuit in a conventional manner by creating a pressure gradient between the intake manifold and the exhaust manifold. The thermal management fluid enters cell pack thermal management device 10 at system port 230 of intake manifold 200 via connector pipe 250. The thermal management fluid passes through the main channel and is divided into the series of channels tuned for even flow distribution. The cross sectional area of each channel of the series of channels is tuned to give a consistent pressure drop across the manifold regardless of the length of the individual channel. Positioning the main channel centrally in the manifold supports the even flow distribution. The thermal management fluid passes through each port 212, into each flexible conduit 100, via conduit port 132 of the inlet spigot 130. Each port 212 provides a slight constriction so as to build up the pressure in the intake manifold 200 to ensure an even distribution of thermal management fluid firstly in the manifold 200, then between the flexible conduits 110. Furthermore, the pressure drop through the inlet spigot is tuned carefully, which also supports providing an even distribution of flow throughout the intake manifold 200. The thermal management fluid flows through the flexible conduit 110, acting on the conduit to push the upper surface 114 and lower surface 115 to conform and contact each individual cell. Heat energy passes to or from the thermal management fluid due to a temperature gradient between the cells and the thermal management fluid. The thermal management fluid exits each flexible conduit 100 at the conduit ports 132 of each outlet spigot 190 which are in fluid communication with each respective port 212 of exhaust manifold 300. The thermal management fluid thereby enters each of the series of channels tuned for even flow distribution which coalesce the thermal management fluid in the main channel of the exhaust manifold 300. The thermal management fluid exits the main channel via system port 230, into pipe 612 with which the system port 230 of exhaust manifold is in fluid communication via connector pipe 250. The thermal management fluid is then recirculated by pump 602.

The cell pack monitoring system 618 monitors the temperature of cell pack 608 and provides data to the controller 616, should the temperature of the cell pack rise above or fall below the ideal operating temperature the controller 616 signals the pump 602 to operate. The pump 602 moves the thermal management fluid along pipe 614 and into heat exchanger 604. The heat exchanger either heats or cools the thermal management fluid depending on whether the cell pack is required to be heated or cooled. The thermal management fluid then exits the heat exchanger 604 and passes along pipe 610 into the cell pack thermal management device 10. The thermal management fluid passes through the flexible conduits 100 and imparts or draws heat to each individual cell due to the created temperature gradient. The thermal management fluid exits the cell pack thermal management device 10 and passes into pipe 612 which feeds pump 602. The thermal management fluid is cycled through the circuit until the ideal operating temperature of the cell pack 608 is reached.

The thermal management device according to the embodiments of FIGS. 1 to 9 may be used to provide a cell pack thermal management system having a predetermined pressure drop or flow rate. For example the length of the flexible conduit between the manifolds and the cross sectional area of the flexible conduit may be specified such that a fluid provided at a given pressure produces an optimised flow rate and pressure drop across the flexible conduit.

The skilled person will be aware that the cell pack thermal management device may be adapted to the length, cross section and positional arrangement as is required to provide an optimised solution for a specific application. For example, the inner shell 202 and the outer shell 204 of the intake manifold 200 are described as being rectangular. However the manifold 200, 300 may take any desired shape to take account of cell pack design.

The underlying configuration of the invention is readily scaleable. It will be appreciated that the configuration, for example length and/or width, of the flexible conduit can be readily adapted by providing different sizes of sheet or sheets from which the flexible conduit is formed. Equally, the number of flexible conduits provided will depend upon the application.

The system of the present invention further provides a user with the ability, via selection of certain system dimensions, to balance pressure drop and flow rate across the thermal management system to ensure that the system fluid is in thermal contact with each cell for the optimum time with minimal parasitic loss.

The invention claimed is:

1. A cell pack thermal management device suitable for use with a cell pack, the device comprising:
   a plurality of flexible conduits, an intake manifold and an exhaust manifold, wherein the plurality of flexible conduits are fluidly connectable between the intake manifold and the exhaust manifold to provide a plurality of fluid paths between the intake manifold and the exhaust manifold and wherein at least one of the intake manifold and the exhaust manifold comprises a manifold body a plurality of conduit ports adapted to fluidly mate with an inlet or an outlet port of each respective flexible conduit, and a system port, and wherein the plurality of conduits ports and the system port are fluidly connected within the manifold body by a series of channels tuned for even flow distribution, wherein the series of channels have differing path lengths and a bore size of the channels are different so as to provide a same pressure drop across and therefore flow rate in each of the series of channels.

2. A cell pack thermal management device according to claim 1 wherein the system port is fluidly connected to the series of channels via a main channel which is arranged centrally in the intake manifold and/or the exhaust manifold.

3. A cell pack thermal management device according to claim 2 wherein a flow into each of the plurality of flexible conduits is restricted by a flow restriction so as to ensure an even flow distribution across the plurality of flexible conduits.

4. A cell pack thermal management device according claim 3 wherein each of the plurality of flexible conduits has an inlet spigot at one end thereof adapted to be connected to the intake manifold, wherein the inlet spigot provides the flow restriction.

5. A cell pack thermal management device according to claim 3 wherein each of the plurality of flexible conduits has an outlet spigot at one end thereof adapted to be connected to the exhaust manifold, wherein the outlet spigot provides the flow restriction.

6. A cell pack thermal management device according to claim 1 wherein the manifold body is configured to fill with thermal management fluid, bleed of air and operate in any orientation.

7. A cell pack thermal management device according to claim 6, wherein a bore size of the series of channels ensures that there is a sufficiently controlled flow of thermal management fluid to flush any air through the series of channels whilst filling with thermal management fluid.

8. A cell pack thermal management device according to claim 1, wherein the manifold body comprises an inner shell and an outer shell, wherein the inner shell and the outer shell are adapted to be joined in a sealed fashion by mutually interlocking features and or welding and or bonding.

9. A cell pack thermal management device according to claim 8, wherein the plurality of conduit ports are provided in the inner shell, wherein the inlet or outlet port of the flexible conduit is bonded and or welded or otherwise sealed to respective plurality of conduit ports.

10. A cell pack thermal management device according to claim 9, wherein the plurality of conduit ports are arranged along an axis X of the inner shell.

11. A cell pack thermal management device according to claim 8, wherein the series of channels are defined, in part, in recesses provided in the inner shell, the outer shell or a combination thereof.

12. A cell pack thermal management device according to claim 1, wherein the intake manifold and exhaust manifold are substantially identical.

13. A cell pack thermal management device according to claim 1, wherein the manifold body comprises an inner shell and an outer shell, wherein the system port is flush with an outer surface of the outer shell.

14. A cell pack thermal management device according to claim 1, wherein the system port has a push-fit joint.

15. A cell pack thermal management device according to claim 1, wherein the plurality of flexible conduits comprises two or more flexible conduits, wherein the plurality of flexible conduits comprises six flexible conduits.

16. A cell pack thermal management device according to claim 1, wherein at least one of the plurality of flexible conduits is formed by one of a pair of sheets joined along their longitudinal edges to provide longitudinal edge seals or a single sheet folded and joined at the opposing longitudinal edges to provide a longitudinal edge seal or a tube.

17. A cell pack thermal management device according claim 16 wherein at least one of the plurality of flexible conduits is provided with a longitudinal spacer to maintain separation of the two sheets, or opposed surfaces of the single sheet.

18. A cell pack thermal management system suitable for use with a cell pack comprising:

a pump;

a heat exchanger; and a cell pack thermal management device according to claim 1;

wherein the system port of the intake manifold is in fluid communication with the heat exchanger and the system port of the exhaust manifold is in fluid communication with the pump, the pump provided to circulate fluid through the cell pack thermal management device thereby providing a temperature gradient between the cell pack and the fluid.

19. A thermally managed cell pack comprising:

a plurality of cells;

a cell pack thermal management system according to claim 18;

wherein the plurality of cells are arranged in a matrix, and the plurality of flexible conduits of the cell pack thermal management device pass between the plurality of cells so as to cool or heat the cells, the surfaces of the plurality of flexible conduits conforming to provide proximal and direct contact with the cell surfaces so as to provide a large contact area for thermal energy exchange.

* * * * *